US010171161B1

(12) United States Patent
Côté et al.

(10) Patent No.: US 10,171,161 B1
(45) Date of Patent: Jan. 1, 2019

(54) MACHINE LEARNING FOR LINK PARAMETER IDENTIFICATION IN AN OPTICAL COMMUNICATIONS SYSTEM

(71) Applicant: Ciena Corporation, Hanover, MD (US)

(72) Inventors: David Côté, Gatineau (CA); Emil Janulewicz, Nepean (CA); Thomas Triplet, Manotick (CA); Qunbi Zhuge, Toronto (CA); Yang Yu, Beijing (CN); Yan Liu, Westmount (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/959,394

(22) Filed: Apr. 23, 2018

(51) Int. Cl.
H04B 10/25 (2013.01)
H04B 10/69 (2013.01)
H04B 10/079 (2013.01)
H04B 10/61 (2013.01)
G06T 7/00 (2017.01)
H04Q 3/52 (2006.01)

(52) U.S. Cl.
CPC ....... H04B 10/0793 (2013.01); G06T 7/0004 (2013.01); H04B 10/6161 (2013.01); H04Q 3/528 (2013.01); G06T 2207/20084 (2013.01); H04Q 2213/13343 (2013.01)

(58) Field of Classification Search
CPC .................. H04B 10/0793; H04B 10/697
See application file for complete search history.

(56) References Cited

PUBLICATIONS

Aoudia et al., End-to-End Learning of Communications System Without a Channel Model, arXiv, Apr. 11, 2018. (Year: 2018).*
Kashi et al., "Artificial Neural Networks for Fiber Nonlinear Noise Estimation", OSA, 2017. (Year: 2017).*
Mo et al., ANN-Based Transfer Learning for QoT Prediction in Real-Time Mixed Line-Rate System, OFC Conference, Mar. 11-15, 2018. (Year: 2018).*
Goodfellow, et al., "Deep Learning", MIT Press. URL: www.deeplearningbook.org, 2016.
He, et al., "Deep Residual Learning for Image Recognition", arXiv, 2015.
Krizhevsky, et al., "Imagenet classification with deep convolution neural networks", Neural Information Processing Systems (NIPS), 2012.

(Continued)

Primary Examiner — Shi K Li
(74) Attorney, Agent, or Firm — Clements Bernard Walker PLLC; Christopher L. Bernard; Lawrence A. Baratta, Jr.

(57) ABSTRACT

Technology for link parameter identification in an optical communications network is described. A first trained artificial neural network (ANN) may be applied to first input values representative of nonlinear noise in a signal received at a receiver from a transmitter over a link in the optical communications system, thereby generating first output values. A second trained ANN may be applied to second input values comprising the first output values and one or more known parameters of the link, thereby generating second output values. One or more link parameter estimates may be identified based on the second output values. In some examples, the first trained ANN has an architecture specialized for two-dimensional image recognition and therefore suitable for the image-like properties of the first input values. For example, the first trained ANN may comprise a deep residual learning network (ResNet) or a Convolution Neural Network (CNN).

20 Claims, 9 Drawing Sheets

(56) References Cited

PUBLICATIONS

Lecun, et al., "Deep Learning", Nature, vol. 521, pp. 436-444, 2015.
Pending U.S. Appl. No. 15/461,718, filed Mar. 17, 2017.
Pending U.S. Appl. No. 15/849,940, filed Dec. 21, 2017.
Pending U.S. Appl. No. 15/828,497, filed Dec. 1, 2017.

* cited by examiner

MACHINE LEARNING FOR LINK PARAMETER IDENTIFICATION IN AN OPTICAL COMMUNICATIONS SYSTEM

TECHNICAL FIELD

This document relates to the technical field of optical communications.

BACKGROUND

An optical communications system or network may comprise one or more links, where a given link connects a transmitter to a receiver by one or more optical fibers. Each link may comprise one or more spans, where a given span comprises a length of fiber and one or more optical amplifiers used to compensate for the attenuation loss in that span.

As a result of chromatic dispersion (CD), an input signal may broaden as it travels down a length of fiber. The net CD of a link may be compensated for using pre-compensation at the transmitter, or post-compensation at the receiver, or some combination thereof. Different fiber types may have different CD characteristics.

SUMMARY

According to a broad aspect, technology for link parameter identification in an optical communications system or network is described. A first trained artificial neural network (ANN) may be applied to first input values representative of nonlinear noise in a signal received at a receiver from a transmitter over a link in the optical communications system, thereby generating first output values. A second trained ANN may be applied to second input values comprising the first output values and one or more known parameters of the link, thereby generating second output values. One or more link parameter estimates of the link may be identified based on the second output values.

According to some examples, the first trained ANN has an architecture specialized for two-dimensional image recognition. For example, the first trained ANN may comprise a deep residual learning network (ResNet) or a Convolution Neural Network (CNN).

According to some examples, the second trained ANN is fully connected.

According to some examples, the one or more link parameter estimates comprise one or more of: a fiber type estimate for each span in the link, an optical nonlinear coefficient (ONLC) estimate for each span in the link, a CD coefficient estimate for each span in the link, an effective fiber core area estimate for each span in the link, an attenuation coefficient for each span in the link, and a length of each span in the link.

According to some examples, the one or more known parameters of the link comprise one or more of: a net chromatic dispersion (CD) of the link, a length of each span in the link, and a launch power of each span in the link.

According to some examples, the second output values comprise a set of fiber type probability values for each span of the link, wherein, for a particular span, each fiber type probability value represents a probability that the particular span comprises a respective fiber type from a set of possible fiber types.

According to some examples, the fiber type probability values are generated by a softmax output layer.

According to some examples, for a particular span of the link, an estimate of a particular parameter may be identified by performing a summation, across the set of possible fiber types, of a known value of the particular parameter associated with each respective fiber type, weighted by the respective fiber type probability value.

According to another broad aspect, technology for training one or more ANNs used for link parameter identification in a multi-span link between a transmitter and a receiver in a communications system is described. For a particular span of the link, transfer learning may be implemented by initializing weights of the one or more ANNs to optimum values determined during training of the one or more ANNs for a previous span of the link. The one or more ANNs may be trained for the particular span of the link by iteratively adjusting the weights of the one or more ANNs, beginning from the initialized weights, to determine optimum weights for the particular span.

According to some examples, the one or more ANNs comprise a first ANN and a second ANN, and the training comprises applying the first ANN to first input values representative of nonlinear noise in a signal over the link to generate first output values, applying the second ANN to the first output values and to one or more known parameters of the link to generate second output values, calculating a difference between a known link parameter and a link parameter estimate identified from the second output values, and adjusting the weights of the first ANN or the second ANN or both based on the difference.

DETAILED DESCRIPTION

Figure 1:
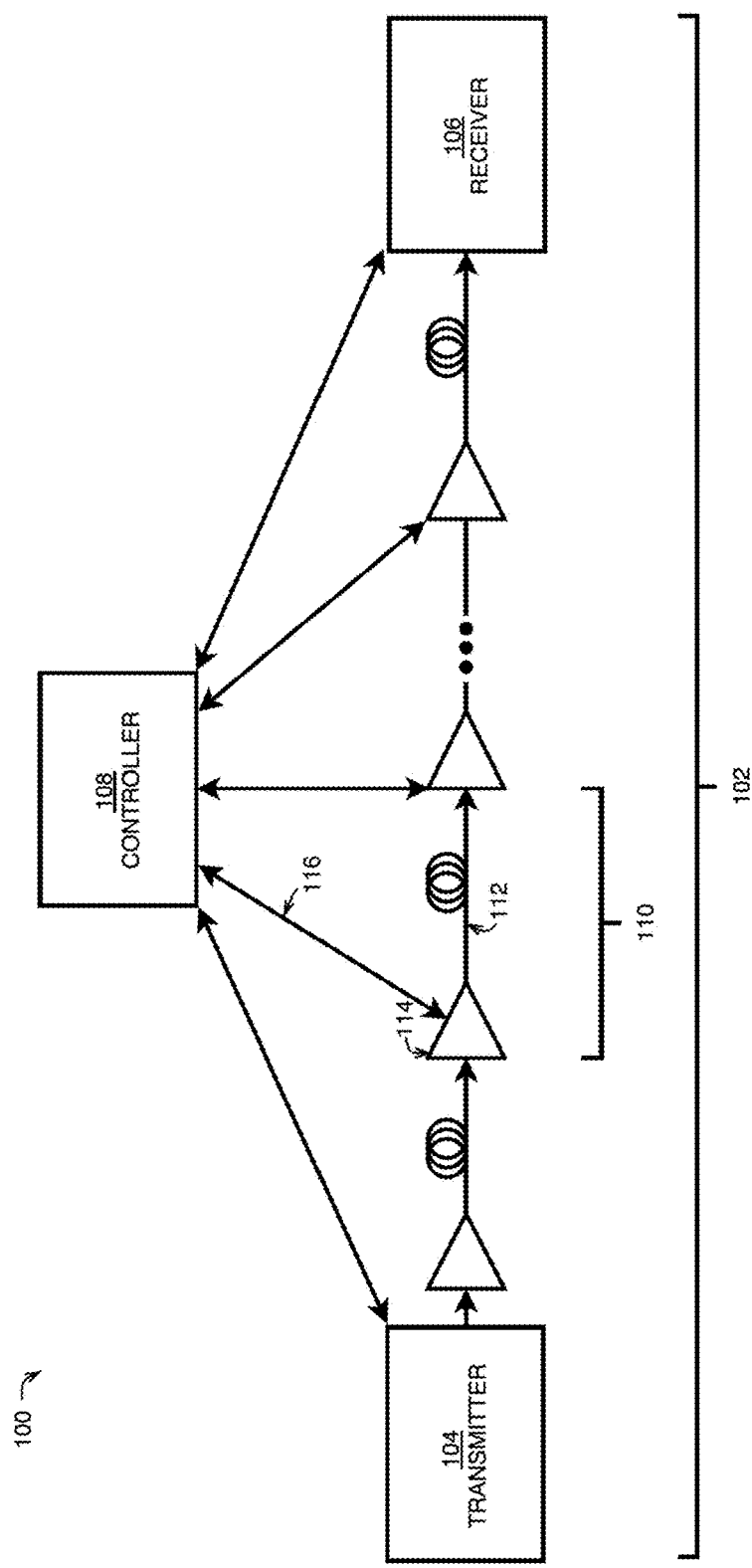
FIG. 1 illustrates an optical communications system in accordance with some examples of the link parameter identification technology disclosed herein.

FIG. 1 illustrates an example optical communications system in accordance with some examples of the link parameter identification technology disclosed herein.

An optical communications system or network 100 may include one or more links, such as a link 102 between a transmitter 104 and a receiver 106. One or both of the transmitter 104 and receiver 106 may operate as a transceiver capable of transmitting and receiving signals. One or both of the transmitter 104 and the receiver 106 may comprise a coherent modem.

Each link in the communications system 100 may comprise one or more spans, where a span may comprise a length of optical fiber and one or more optical amplifiers, such as erbium-doped fiber amplifiers (EDFAs), multi-stage EDFAs, hybrid EDFA/Raman amplifiers, and the like. For example, the link 102 comprises the span 110, which comprises an optical amplifier 114 and a length of fiber 112. The optical amplifier 114 may be used to compensate for the attenuation loss in the length of fiber 112.

Each span, such as the span 110, may comprise one or more fiber types. Examples of fiber types include Non-Dispersion-Shifted Fiber (NSDF), Large Effective Area Fiber (LEAF), Enhanced Large Effective Area Fiber (EL-EAF), TrueWave Classic (TWC), Lambda Shifted (LS), TrueWave Reduced Slope (TWRS), and the like. The amount of attenuation loss in a length of fiber may depend on the fiber type(s) that make up that length.

Accurate knowledge of the span fiber types in a link may be advantageous for optimizing transmissions over the link. For example, knowledge of the fiber type(s) of span 110 may be used to select an optimal launch power for the optical amplifier 114 in order to minimize the sum of linear and nonlinear noise in the fiber length 112.

Operations of the various components of the communications system 100, including the transmitter 104, the receiver 106, and the plurality of optical amplifiers in the link 102, may be controlled by a controller 108. For example, the controller 108 may provide instructions to the optical amplifier 114, as denoted by arrow 116, to provide a particular gain.

Although not explicitly illustrated, other elements may be present in the link 102, such as wavelength selective switches, optical multiplexers, optical de-multiplexers, optical filters, and the like.

Usually, the span fiber types that are present within a given link, such as the link 102, are known. However, a non-negligible percentage of spans within the link may be incorrectly identified as comprising different fiber types than the fiber types that are actually present in those spans. Alternatively, or additionally, there may be some percentage of spans within the link that have unknown fiber types. When the fiber types in a link are misidentified or unknown, this may lead to an offset in provisioned launch power with respect to optimal launch power, which may reduce the signal-to-noise ratio (SNR) of received signals, thereby reducing network capacity. In another example, when the fiber types in the link are misidentified or unknown, the uncertainty of link budgeting may increase, which may require an increased margin network planning to address this uncertainty, thereby reducing network capacity. It may be difficult or impossible to directly identify the fiber types that exist within all the spans of a given link, as some portions of the link may be remotely located or inaccessible. Accordingly, technology that is capable of remotely identifying the fiber types that exist within a link may be of interest.

Link accumulated optical noise consists of linear and nonlinear contributions. The linear noise results from optical amplification, that is, amplified spontaneous emission (ASE) noise. An important nonlinear noise results from the Kerr effect in optical fiber. The Kerr effect is a third-order nonlinearity, in which three fields (separated in time, or separated in frequency) interact to produce a fourth field. The Kerr effect is referred to as intra-channel Kerr nonlinear noise in cases where the three interacting fields are within a channel and the resulting fourth field is also within that same channel. The Kerr effect is referred to as inter-channel Kerr nonlinear noise in cases where the three interacting fields are between different channels (that is, one interacting field is from one channel and two interacting fields are from another channel, or each interacting field is from a different channel) and in cases where the three interacting fields are from one channel and the resulting fourth field is in a different channel.

The ratio of linear to nonlinear noise depends on the power of optical signals during transmission. At small launch power, the link accumulated noise is dominated by linear noise due to low optical signal-to-noise ratio (OSNR). At high launch power, the fiber nonlinearities can dominate.

An optical receiver, such as the receiver 106 in FIG. 1, may be configured to isolate a noise component of a received signal. Isolation of the noise component may be achieved from the received symbols and estimated transmitted symbols, or from the received symbols and training symbols. Isolation of the noise component assumes that nonlinear noise is a small perturbation of the otherwise linear transmit signal:

$$A' = A + \Delta A \tag{1}$$

where A is the transmitted signal, A' is the received signal, and $\Delta A$ is the nonlinear noise component of the received signal. A, A', and $\Delta A$ are functions of time t and distance z. Other noise, including linear noise and transceiver internal noise, is ignored in equation (1).

Based on perturbation theory, the nonlinear Schrödinger equation can be expressed as $$\frac{\partial \Delta A}{\partial z} - \frac{i\beta_2}{2} \frac{\partial^2 \Delta A}{\partial t^2} + \frac{a}{2} \Delta A = -i\gamma |A|^2 A \tag{2}$$

where $\beta_2$ is a second order dispersion coefficient, $\alpha$ is an attenuation coefficient of the optical power, and $\gamma$ is the fiber nonlinear coefficient.

With single-polarization signals, the intra-channel Kerr nonlinear noise component indexed by k may be represented approximately as $$\Delta A[k] = \Sigma_{m,n} C[m,n] A[k+m] A[k+n] A^*[k+m+n] \tag{3}$$

where A[k] is the transmitted symbol indexed by k, and the asterisk (*) denotes conjugation. C [m, n] denotes a matrix of coefficients, also referred to as a C-matrix, which will be discussed in more detail below. A[k] is a sampled version of A in equations (1) and (2).

As mentioned above, in the Kerr effect, three fields (separated in time, or separated in frequency) interact to produce a fourth field. Thus equation (3) involves a triplet of symbols: a symbol indexed by k+m, a symbol indexed by k+n, and a symbol indexed by k+m+n. The triplet is represented by the shorthand (k,m,n,m+n).

In the time domain, the three interacting fields may be represented with $A[k]=A(k·\Delta t)$ where $\Delta t$ is the sample duration, and the corresponding C-matrix may be in the time domain.

In the frequency domain, the three interacting fields may be represented with $A[k]=\tilde{A}(k·\Delta f)$, where $\tilde{A}(f)$ is the Fourier transform of A(t) and $\Delta f$ is the frequency spacing, and the corresponding C-matrix may be in the frequency domain.

In the symbol domain, the three interacting fields may be represented with with $A[k]=A(k·T)$ where T denotes the symbol duration, and the corresponding C-matrix may be in the symbol domain.

The indices m and n can take on negative values, zero values and positive values. For example, the sequence A[−2], A[−1], A[0], A[1], A[2] represents five consecutively transmitted symbols. The contribution of the nonlinear intra-channel interaction between A [−1], A[1], and A[2] to the intra-channel Kerr nonlinear noise, ΔA [0], is given by C[−1,2]A[−1]A[2]A*[1].

The coefficients of the C-matrix C[m, n], generally referred to as C-coefficients, characterize how the Kerr effect is manifested in the channel over which the symbols have been transmitted and received. That is, the C-matrix C [m, n] characterizes the fourth field that is produced by the Kerr effect.

Assuming the power of symbols is normalized, the C-matrix C[m, n] can be estimated by evaluating the cross-correlation between the intra-channel noise component and the field of the (k,m,n,m+n) triplet.

The C-matrix C[m, n] and can be evaluated as follows:

$$C[m,n]=E[\Delta A[k]\cdot A^*[k+m]\cdot A^*[k+n]\cdot A[k+m+n]] \quad (4)$$

where E is an expectation, which is a weighted average. In equations (3) and (4), the transmitted symbols can be replaced by the received symbols.

The above describes in general terms how a C-matrix may be computed based on a single-polarization signal received at a receiver. U.S. Ser. No. 15/461,718 to Reimer et al., filed on Mar. 17, 2017 and incorporated by reference herein, provides a more detailed explanation of C-matrix calculations for dual-polarization signals. A coherent modem may be configured to compute C-matrices based on received symbols and estimated transmitted symbols, or based on received symbols and training symbols, as described by Reimer et al.

The C-coefficients of a C-matrix characterize how the Kerr effect is manifested in a given link between a transmitter and a receiver. Manifestation of the Kerr effect depends on the properties of the link. Accordingly, a single C-matrix calculated for a given link comprising one or more spans may depend on the parameters of each span in the link, including the length of each span, the fiber type of each span, the chromatic dispersion (CD) coefficient of each span, the attenuation loss coefficient of each span, the optical nonlinear coefficient (ONLC) of each span, and the launch power of each span. For a theoretical link consisting of only one span, a single C-matrix could be used to infer one or more parameters of the span, such as the fiber type. Additional parameters, such as span length and launch power, may assist in the estimation of fiber type, while additional C-matrices may improve the accuracy of the estimate. For a link that comprises more than one span, a single C-matrix may be insufficient to infer the parameters of each span within the link.

CD causes an input signal to broaden as it travels down a length of fiber. This broadening is the result of different velocities experienced by different spectral components of the signal. Different fiber types may have different CD characteristics. A technique known as dispersion compensation may be used to compensate for the net CD in a given link. Dispersion compensation is achieved by providing a dispersion that opposes, or compensates for, the dispersion in the link. Dispersion compensation may be performed using some combination of pre-compensation at the transmitter and post-compensation at the receiver. The sum of the CD pre-compensation and post-compensation should always be substantially equal to the net CD of the link but with the opposite sign, so as to substantially compensate for the net CD of the link.

An impulse response will reach a minimum width at a particular location within the link. This location is dependent on what proportion of the compensation is performed at the transmitter (i.e., the percentage of pre-compensation), relative to what proportion of the compensation is performed in the receiver (i.e., the percentage of post-compensation). For example, if 90% of the compensation is performed at the transmitter, the narrowest impulse response along the link may occur close the receiver, after which the pulse may briefly begin to increase in width, and then the remaining 10% of the compensation may be performed at the receiver to narrow the width. Alternatively, if 10% of the compensation is performed at the transmitter, the narrowest impulse response along the link may occur close the transmitter, after which the pulse may increase in width until reaching the receiver, at which point the remaining 90% of the compensation may be performed.

The location of the narrowest impulse response corresponds to the location of the lowest peak-to-average power ratio (PAPR). This is also the location where the nonlinear noise contribution is the lowest. Thus, the choice of the relative percentages of pre-compensation and post-compensation may determine the location of lowest nonlinearity in the link. Generally, other locations in the link may experience a significantly higher, and relatively consistent, amount of nonlinearity. The extent of the reduction in the nonlinear noise contribution at the location of the narrowest impulse response may be dependent on the fiber parameters at that location. In other words, for a given link in an optical communications system, there is a relationship between the link parameters and the C-matrices (or other related results, such as nonlinear noise variance) that are calculated at various CD pre-compensation/post-compensation values. This relationship may be exploited in order to infer unknown link parameters.

For example, a plurality of C-matrices may be calculated at a corresponding plurality of CD pre-compensation values. Each different CD pre-compensation value is accompanied by a complementary CD post-compensation value at the receiver, such that the total CD compensation is always equivalent to the CD of the link. As described above, each different CD pre-compensation corresponds to a particular location in the link of the narrowest impulse response. By repeating signal measurements over a range of CD pre-compensation values, one is effectively "scanning the link" at a plurality of locations, the results of which may be used to obtain additional information about the fiber parameters. Specifically, for each different CD pre-compensation value, a new C-matrix may be calculated by isolating the noise component of a transmitted signal, as described previously. In conjunction with known link parameters such as the net CD of the link and the launch power and length of each span in the link (which may be added together to determine the total length of the link), the calculated C-matrices may be used to identify one or more unknown parameters of the link, such as the fiber types present at the plurality of locations that correspond to the plurality of CD pre-compensation values.

In practice, it may be difficult or impossible to derive unknown link parameters from C-matrices using analytical methods, empirical methods, or brute force search methods, since the number of parameter combinations may become prohibitively large as the number of spans in a link increases.

In U.S. Ser. No. 15/849,940 to Zhuge et al., filed on Dec. 21, 2017 and incorporated herein by reference, it was proposed that machine learning may be used to estimate or predict unknown link parameters using C-matrices in combination with known link parameters.

Machine learning, also known as deep learning, may be implemented in the form of one or more artificial neural networks (ANNs). An ANN comprises a plurality of interconnected nodes or neurons which may be trained to mimic a relationship between known input values and known output values. ANN training may be achieved by iteratively adjusting variables or weights associated with the nodes until certain training criteria are satisfied. Once trained, the ANN represents an algorithm that may be able to predict one or more output values from one or more input values.

Generally, the nodes of an ANN are divided into layers. Nodes that receive input values belong to an input layer, and nodes that generate output values belong to an output layer. Between the input layer and the output layer, there may exist one or more hidden layers which include nodes that are connected to other nodes. As the number of hidden layers increases, the "depth" of the ANN may be understood to increase. Where the architecture of the ANN is such that every node in a given layer is connected to every node in the preceding layer, the ANN may be referred to as "fully connected". In contrast, where the connections in the ANN are restricted such that any one node accepts inputs only from a small subset of the nodes in the preceding layer, the ANN may be referred to as "non-fully connected". There are many types of non-fully connected ANNs. One example is a Convolution Neural Network (CNN). Deep learning is described in detail, for example, by Goodfellow et al. in "Deep Learning." (MIT Press, 2016); by LeCun et al. in "Deep Learning." (Nature, Volume 521, pp. 436-444, 2015) and by Krizhevsky et al. in "Imagenet classification with deep convolution neural network" (NIPS, 2012), which are incorporated herein by reference.

As described by Zhuge et al., one or more C-matrices may be calculated from one or more corresponding signals received at a receiver from a transmitter over a link in an optical communications system, where each C-matrix comprises a plurality of C-coefficients representative of nonlinear noise in the received signal. Together with known link parameters, the C-coefficients may be inputted into one or more trained ANNs. The one or more trained ANNs may generate output values which may be used to identify estimates of one or more unknown link parameters. Depending on which link parameters are already known, the unknown link parameters may include, for example, span fiber parameters such as fiber types, ONLCs, CD coefficients, effective fiber core areas, attenuation coefficients, span lengths, and the like. The unknown link parameters may alternatively or additionally include other parameters such as the launch powers of the spans in the link. In some examples, the link parameter estimates may be identified on a per-span basis.

One may consider an example of a link consisting of twenty spans, where the known link parameters include (i) one launch power per span (20 input values); (ii) one length per span (20 input values); and (iii) the net CD of the link (1 input value). If C-matrices are calculated using forty different CD pre-compensation values, and each C-matrix comprises 300 C-coefficients, the total number of C-coefficients will be 12,000, which includes 12,000 real values and 12,000 corresponding imaginary values. Thus, there will be a total of 24,000 input values that are representative of nonlinearity in the link. Accordingly, in this example, there will be a total of 24,041 input values from which to derive unknown link parameters using one or more trained ANNs.

When designing a machine learning architecture for identifying estimates of unknown link parameters from C-coefficients and known link parameters, it may be a challenge to glean as much information as possible from the large number of input values, while also maintaining reasonable limits on the computational resources required to perform the calculations. For example, one may consider applying a single fully-connected feed-forward ANN to all 24,041 input values. Where the ANN is deep, the link parameter estimates may be highly accurate, but the computation time or the associated power or heat may be prohibitively high. Alternatively, where the ANN is shallow, fewer computational resources may be needed to generate the link parameter estimates, but those estimates may be less accurate.

One option for reducing the computational resources required for ANN calculations is to first process the C-matrices to obtain a reduced set of C-coefficients. This processing may be achieved, for example, using Principal Component Analysis (PCA). Applying PCA to the C-matrices may remove redundancies and provide a more manageable set of input values for the one or more ANNs. For example, the set of 12,000 C-coefficients could be reduced down to 200 C-coefficients (consisting of 200 real values and 200 imaginary values), thereby significantly reducing the total number of input values from 24041 down to 441. Using a reduced set of C-coefficients may reduce the computational resources needed for the ANN calculations, but may also reduce the accuracy of the link parameter estimates, since some of the input data is necessarily being discarded.

The efficiency and accuracy of an ANN depends on its architecture (i.e., the number of nodes in the ANN and the manner in which the nodes are connected to one another), but also on how well that architecture is suited to the particular application to which the ANN is being applied. Certain ANN architectures may be specialized for certain applications. For example, image recognition is often achieved using CNN architectures, as described, for example, by LeCun et al. in "Backpropagation applied to handwritten zip code recognition." (Neural computation, 1989) and by Krizhevsky et al. in "Imagenet classification with deep convolution neural network" (NIPS, 2012), both of which are incorporated herein by reference. When used for image recognition, CNN architectures may allow for faster training or deeper networks, or both, while providing high accuracy and generalization. One CNN architecture that has been shown to be particularly effective for image recognition is Microsoft's Deep Residual Networks (ResNet) architecture, which is described, for example, by He et al. in "Deep Residual Learning for Image Recognition" (arXiv, 2015), which is incorporated herein by reference. In the ImageNet Large Scale Visual Recognition Challenge 2015 (ILSVRC2015), ResNet demonstrated better classification, localization, and detection than its competitors. A variety of ANN architectures may be suitable for image recognition.

Figure 2:
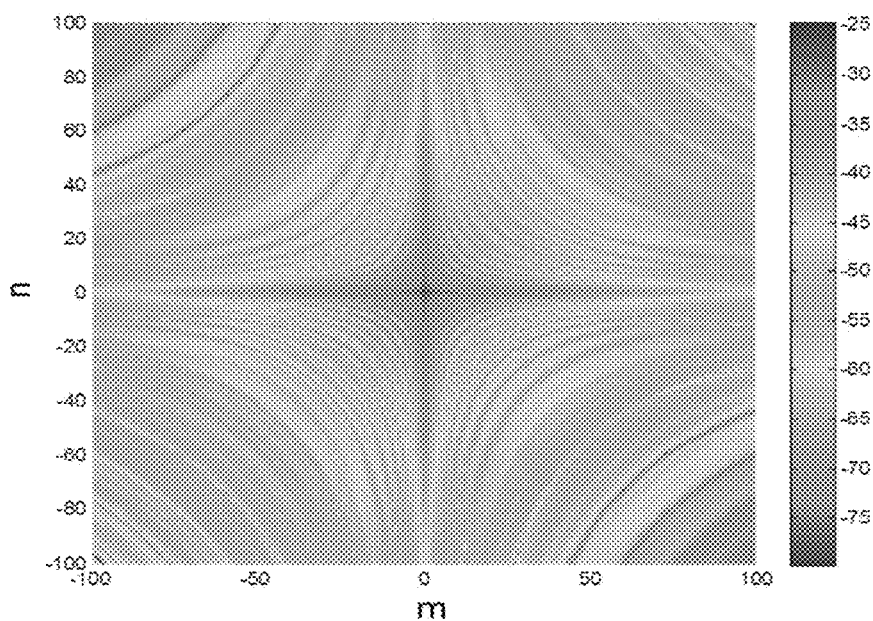
FIG. 2 illustrates an example C-matrix.

FIG. 2 illustrates an example C-matrix, C[m,n], where $-100 \leq m \leq 100$, and $-100 \leq n \leq 100$. At each position [m, n] the value of the C-coefficient is represented by a pixel having a corresponding shade of grey, as indicated by the legend.

It is apparent from FIG. 2 that the example C-matrix exhibits properties that are similar to those of a two-dimensional image. Accordingly, when applying an ANN to the C-coefficients of one or more C-matrices, it may be advantageous to use an ANN architecture that is specialized for two-dimensional image recognition. For other input values that do not have image-like properties (such as span launch powers, span lengths, and the net CD of the link), it may be advantageous to use a different ANN architecture. In some examples, the ANN applied to the non-image-like input values may have a fully-connected architecture.

As will be described herein, first input values having substantially image-like properties (i.e., C-coefficients) may be decoupled or split from second input values having substantially non-image-like properties (i.e., known link parameters such as span launch powers, span lengths, and the net CD of the link). The first input values and the second input values may be processed using distinct ANNs having different architectures. This strategy of using different ANNs for different blocks of input values may provide more efficient processing, may produce more accurate estimates of unknown link parameters and may reduce training time, as compared to feeding all input values into a single ANN.

Figure 3:
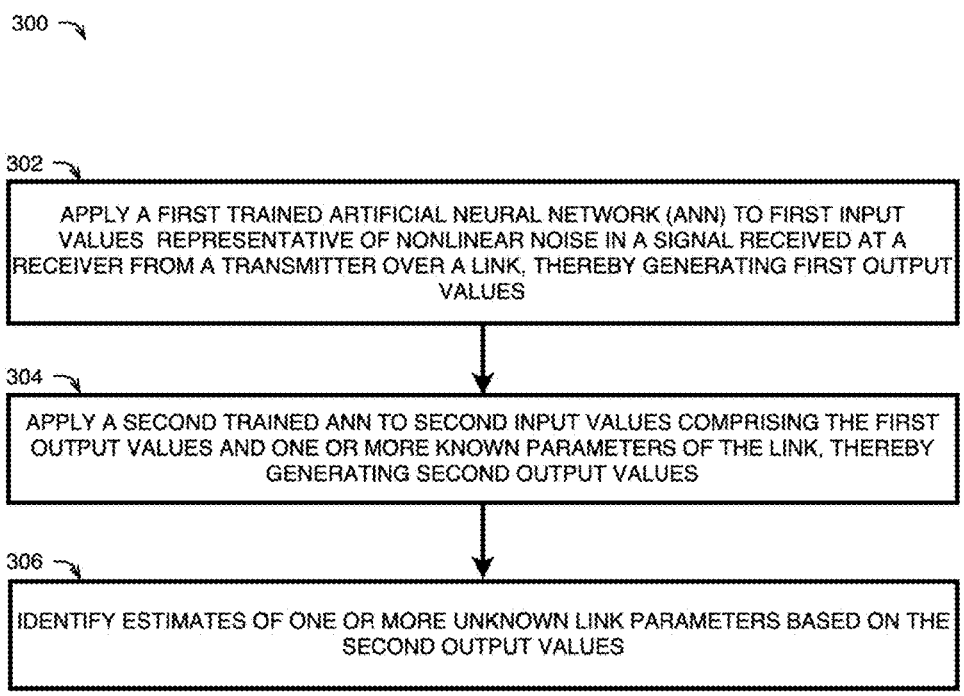
FIGS. 3 and 4A-4B illustrate methods for link parameter identification using machine learning in accordance with some examples of the technology disclosed herein.
Figure 4A:
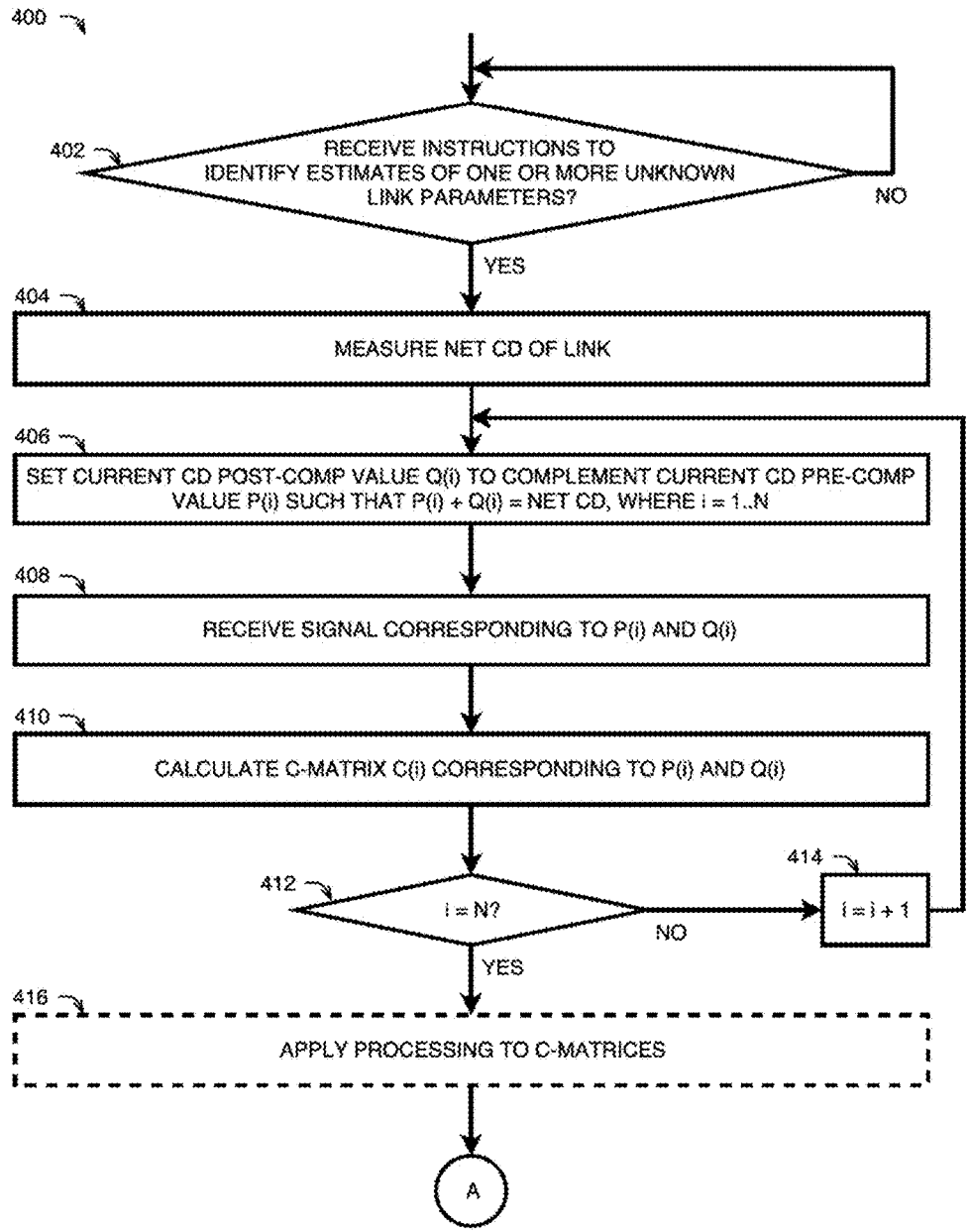
Figure 4B:
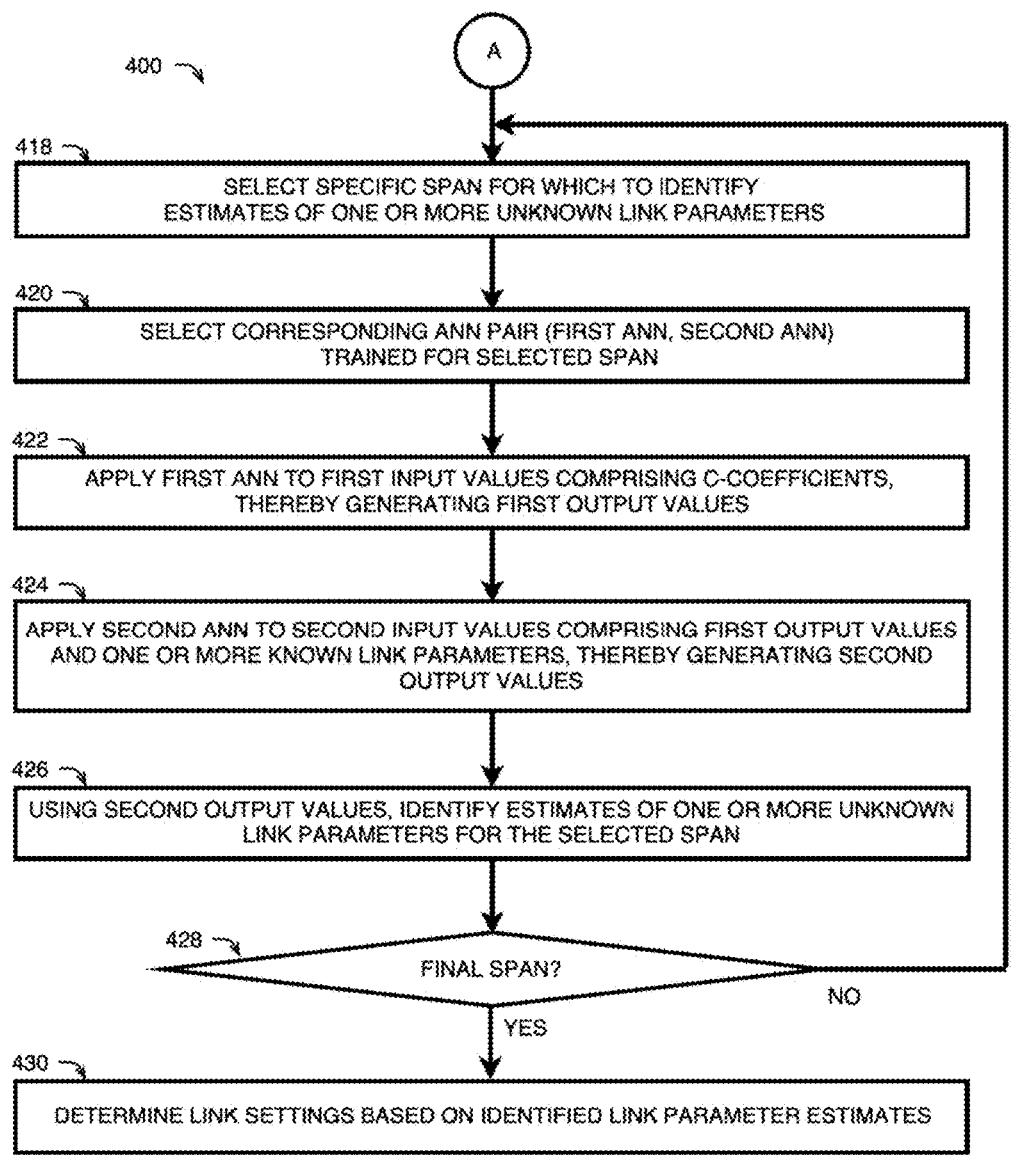

FIGS. 3 and 4A-4B illustrate methods 300 and 400, respectively, for link parameter identification using machine learning in accordance with some examples of the technology disclosed herein. The methods 300 and 400 may be performed in an optical communications system, such as the system 100.

Aspects of the link parameter identification methods 300 and 400 may be performed at a receiver, such as the receiver 106. In some examples, portions of the methods 300 and 400 may be performed at a controller of the communications system, such as the controller 108. The methods 300 and 400 may be performed during an out-of-service period, during which no other data transmissions are taking place between the transmitter and the receiver. The methods 300 and 400 may be initiated manually, for example, by a network operator, or automatically in response to a network event. For example, the methods 300 and 400 may be initiated when a connection is routed to a new path in which some of the spans are unknown. In some examples, the methods 300 and 400 may be performed once following the installation of a link.

The methods 300 and 400 may be performed using pairs of trained ANNs, each pair comprising a first ANN and a second ANN. An example method for ANN training is described with reference to FIGS. 5A-5B.

Referring to the example method 300 illustrated in FIG. 3, at 302, a first trained ANN may be applied to input values (i.e., "first input values") which are representative of nonlinearity in the link. For example, the first input values may comprise a plurality of C-coefficients of one or more C-matrices, where the C-coefficients of each C-matrix are representative of nonlinear noise in a signal received at a receiver from a transmitter over a link in an optical communications system. The first ANN may have a deep architecture and may be specialized for two-dimensional image recognition. In some examples, the first trained ANN has a CNN architecture. In one example, the first trained ANN has a ResNet architecture. Application of the first ANN to the first input values may generate first output values.

At 304, a second trained ANN may be applied to input values (i.e., "second input values") comprising the first output values generated at 302 and one or more known parameters of the link, such as the length of each span in the link, the launch power of each span in the link, and the net CD of the link. Application of the second ANN to the second input values may generate second output values. The second ANN may be distinct from the first ANN and may have a different architecture than the first ANN. In one example, the second ANN is shallow and fully connected.

At 306, one or more link parameter estimates may be identified based on the second output values generated at 304. Depending on which known link parameters are inputted into the second ANN, it may be possible to identify estimates of one or more unknown link parameters, including, for example, one or more fiber types, one or more ONLCs, one or more CD coefficients, one or more effective fiber core areas, one or more attenuation coefficients, one or more span launch powers, one or more span lengths, and the like. The link parameter estimates identified at 306 may subsequently be used to control a state of the optical communications system to achieve an objective, such as improved network performance.

A combination of CD pre-compensation applied at the transmitter and CD post-compensation applied at the receiver may substantially compensate for a net CD of the link. Where the C-coefficients included in the first input values at 302 are from a plurality of C-matrices, each C-matrix may have been calculated from a corresponding received signal, and a different amount of CD post-compensation may have been applied at the receiver for each received signal. This will now be described in more detail with reference to the method 400 illustrated in FIGS. 4A-4B.

At 402, the receiver may receive instructions to identify one or more parameters of the fibers in a link. For example, the controller 108 may send instructions to the transmitter 104 and to the receiver 106 to begin the link parameter identification method 400. The instructions received by the receiver at 402 may include an indication of parameters to be used in the method 400, such as a number and distribution of CD post-compensation values to be used for the plurality of C-matrix calculations. Similarly, the transmitter may receive instructions indicating the corresponding number and distribution of CD pre-compensation values to be used. The CD pre-compensation and CD post-compensation values may be denoted as $P(i)$ and $Q(i)$, respectively, for $i=1 \ldots N$, where N is a positive integer. Each pair of CD pre-compensation and CD post-compensation values, $(P(i), Q(i))$, may have a sum that is substantially equal to the net CD of the link but with the opposite sign, so as to substantially compensate for the net CD of the link. For ease of explanation, the CD pre-compensation values $P(i)$ and the CD post-compensation values $Q(i)$ may be referred to in units of percentage of the net CD of the link, such that $P(i)+Q(i)=100\%$.

As shown at 404, the net CD of the link may be measured at the receiver in response to receiving the instructions at 402. Alternatively, the net CD may be measured or calculated at some other time prior to beginning the method 400.

One may consider a simple example in which N different C-matrices, denoted $C(i)$ for $i=1 \ldots N$, are to be calculated for N=5 different CD pre-compensation values that are evenly distributed between 0% and 100% in ascending order. In this example, five C-matrices would be computed for five CD pre-compensation/post-compensation pairs as illustrated in Table 1 below.

TABLE 1

| C-matrix C(i) | CD pre-compensation P(i) | CD post-compensation Q(i) |
|---|---|---|
| C(1) | P(1) = 0% | Q(1) = 100% |
| C(2) | P(2) = 25% | Q(2) = 75% |
| C(3) | P(3) = 50% | Q(3) = 50% |
| C(4) | P(4) = 75% | Q(4) = 25% |
| C(5) | P(5) = 100% | Q(5) = 0% |

The number and distribution of CD pre-compensation/post-compensation values may be determined based on known, expected or estimated parameters of a given link, such as a length of the link, a number of spans within the link, lengths of the individual spans, and the like. Generally, as the number of spans in a link increases, the more individual C-matrix calculations may be necessary to obtain accurate link parameter identification according to the method 300. Although the above example uses a set of five evenly-distributed CD pre-compensation percentages which are implemented in ascending order, many other distributions and orders are possible. In some examples, the number N of (P(i),Q(i)) pairs may be at least as high as the number of spans known to be in the link. For example, where a link is known to consist of ten spans, a decision may be made to calculate C matrices for N=20 different (P(i),Q(i)) pairs. In another example, a single C-matrix comprising thousands of C-coefficients might already contain enough information to enable a relatively accurate estimation of all span parameters.

At 406, the receiver may set the first CD post-compensation value Q(1) to a value that complements the first CD pre-compensation value P(1) that is expected to be used at the transmitter for the first transmitted signal.

At 408, the receiver may receive the signal associated with the first CD pre-compensation value P(1) and the first CD post-compensation value Q(1). In the example above, these values would be P(1)=0% and Q(1)=100%.

At 410, the receiver may calculate a first C-matrix C(1) from the signal received at 408. The C-matrix C(1) may be calculated, as described previously, by isolating the nonlinear noise component of the received signal.

At 412, the receiver may determine whether one or more additional C-matrices are to be calculated at one or more additional CD pre-compensation values. For example, the receiver may check whether the current value of index i is equal to the total number of C-matrices N to be calculated. In the example above, the receiver may determine that the current value of index i is 1, which is not equal to N(=5), and the receiver may increment the value of index i by 1, as denoted at 414. At this point, the receiver may return to step 406 and may set the current CD post-compensation value Q(2) to a value that complements the second CD pre-compensation value P(2) that is expected to be used at the transmitter for the second transmitted signal. In the example above, these values would be P(2)=25% and Q(2)=75%. The receiver may then receive the second signal at 408. At 210, the receiver may calculate a second C-matrix C(2) that corresponds to the CD pre-compensation value P(2) and the CD post-compensation value Q(2). In this manner, the receiver may calculate a plurality of C-matrices, where each C-matrix corresponds to a different (P(i),Q(i)) pair. Although not explicitly illustrated in the method 400, signal properties other than C-coefficients may be measured or calculated at the receiver for each CD pre-compensation/post-compensation pair, including noise variance, noise correlations, receive signal correlations, and the like. It should also be noted that other signal properties may be used to extract link information.

Once it is determined at 412 that no additional C-matrices are to be calculated (i.e., that index i=N), the C-coefficients may optionally undergo processing, as shown at 416. The processing may comprise data reshaping, zero padding, or both. According to one example, where N=40 and each C-matrix calculated at 410 consists of 300 C-coefficients (including 300 real values and 300 imaginary values), the resulting 24000 nonlinearity input values (12000 real values and 12000 imaginary values) may be reshaped into a data set having dimensions 300×40×2. The reshaped data set may subsequently be padded with zeroes to result in a padded data set having dimensions 304×48×2.

At Link A, the method 400 continues to the steps illustrated in FIG. 4B. At 418, there a specific span may be selected for which to identify estimates of one or more unknown link parameters. At 420, a corresponding ANN pair (comprising a first ANN and a second ANN) may be selected, the ANN pair having been previously trained for the specific span selected at 418. An example ANN training method 500 will be described further with respect to FIGS. 5A-5B.

At 422, the C-coefficients from the C-matrices calculated at 410 (or from the processed set determined at 416) may be inputted into the first ANN of the trained ANN pair selected at 420. As the C-coefficients may exhibit image-like properties, the first ANN may have an architecture that is specialized for two-dimensional image recognition. For example, the first ANN may comprise a CNN or ResNet architecture. The first ANN may be applied to the C-coefficients to generate first output values.

Known parameters of the link, such as the net CD measured at 404, the length of each span in the link, and the launch power of each span in the link, may provide information that can be used in the estimation of unknown link parameters. However, as these known link parameters may not exhibit image-like properties, these parameters may not be inputted into the first ANN, and may instead be inputted into a second ANN having a different architecture.

As shown at 424, one or more known link parameters may be inputted into the second trained ANN of the ANN pair selected at 420, together with the first output values generated at 422. In one example, the second ANN has a fully connected architecture. The second ANN may be applied to the one or more known link parameters and to the first output values to generate second output values.

At 426, the second output values of the second ANN may be used to identify estimates of one or more unknown link parameters for the specific span selected at 418. Depending on which link parameters are already known, the unknown link parameters that may be identified may include the fiber type(s) of the span, the ONLC of the span, the CD coefficient of the span, the effective fiber core area of the span, the attenuation of the span, the launch power of the span, the length of the span, and the like. Each parameter identified at 426 may represent an estimate of the true parameter. Accordingly, there may be some amount of uncertainty associated with each identified parameter. This uncertainty, or error estimate, may depend on a variety of factors, such as the manner of calculating the C-matrices at 410, the manner of processing the C-coefficients at 416, the respective architectures of the first and second ANNs employed at 422 and 424, and the nature of the training methods used for the ANNs.

In one example, the second ANN applied at 424 comprises an output layer which provides a set of probability values corresponding to the set of fiber types that are possible for the span selected at 418. In one example, the output layer is a softmax layer. In one example, the fiber type having the highest probability may be identified as the estimated fiber type for that span. Using the probability values from the softmax layer, it may also be possible to estimate other fiber parameters for the selected span. For example, the ONLC of the selected span may be estimated by performing a summation across all possible fiber types of the true ONLC of each fiber type, weighted by the respective probability of that fiber type, as determined from the softmax layer. For example, it may be determined from the softmax output that the currently selected span has the following fiber type probabilities: $P_{NSDF}$=0.6; $P_{LEAF}$=0.2; $P_{TERA}$=0.2. The true ONLCs for these fiber types are: $ONLC_{NSDF}$=34.51 dB; $ONLC_{LEAF}$=28.01 dB; $ONLC_{TERA}$=29.76 dB. Thus, according to one example, the ONLC estimate for the currently selected span may be calculated as: $P_{NSDF} \cdot ONLC_{NSDF} + P_{LEAF} \cdot ONLC_{LEAF}$ $P_{TERA} \cdot ONLC_{TERA} = 0.6 \cdot 34.51 + 0.2 \cdot 28.01 + 0.2 \cdot 29.76 = 32.26$ dB.

If it is determined at 428 that there are additional spans for which unknown link parameters are to be estimated, the method may proceed to 418 and a subsequent span may be selected for which to perform steps 420-426. Once it is determined at 428 that the currently selected span is the final span for which unknown link parameters are to be estimated, the method 400 may proceed to step 430, and link settings may be determined based on the parameter estimates identified for each span at 426. For example, the parameters may be used to determine an optimal gain for each optical amplifier in order to reduce noise and to maximize the SNR of transmissions over the link. The link settings determined at 430 may then be applied to one or more elements of the communications network, such as the transmitter and the receiver of the link, any optical amplifiers in the link, any wavelength selective switches in the link, and the like. The link settings may be applied by the controller in the form of a control scheme which establishes a state of the communications network. The state of the network may be controlled in order to achieve specific objectives, such as performance improvements, such as a reduction in the margins required in network planning and an increase in overall network capacity.

Portions of the methods 300 and 400 may be performed using some combination of the transmitter and the receiver of a given link, such as the transmitter 104 and the receiver 106, and a controller, such as the controller 108. Aspects of the methods 300 and 400 may be implemented using some combination of firmware, software, and/or hardware, including application-specific integrated circuits (ASICs), located in the different elements of the communications system. Instructions for implementing each aspect of the methods 300 and 400 may be stored on one or more non-transitory computer-readable media for execution by one or more processors of the respective elements used to implement the methods 300 and 400, such as one or more central processing units (CPUs) or graphics processing units (GPUs), or some combination thereof. In one example, the method 300 may be executed by a CPU in a matter of milliseconds, while the method 400, which includes the calculation of one or more C-matrices, may be executed in a matter of several minutes. In practice, it may be of interest to limit the amount of communications between the receiver and the controller. A given communications network may comprise thousands of receivers, so reducing communications between the receivers and the controller may prevent the network from becoming bogged down.

In one example, the transmitter and the receiver may each comprise respective firmware storing computer-executable instructions. The transmitter may be configured, in response to instructions to begin a method of link parameter identification, to send a series of impulse responses over the link at a plurality of different CD pre-compensation values. The receiver may be configured, in response to instructions to begin the method of link parameter identification, to calculate a C-matrix upon receipt of each impulse response over the link (denoted at 410), and to adjust the CD post-compensation value to complement the CD pre-compensation value used at the transmitter. The receiver may further be configured to perform the processing at 416. The receiver may then apply the ANNs at 422 and 424 in order to convert the C-coefficients into a series of fiber type estimates corresponding to respective locations in the link. The receiver may send the fiber type estimates (optionally including corresponding error estimates) as a function of location to the controller. Following receipt of this information from the receiver, the controller may combine it with other information about the link, such as information measured by other elements in the communications system. In this manner, the fiber type estimates obtained from the receiver for the given link may be used to improve the accuracy of the information possessed by the controller about that link. For example, estimates obtained from ANNs may be combined with those obtained from other estimation methods, such as inline measurement instruments, in order to improve accuracy. Based on this enhanced information, the controller may determine how one or more elements of the communications system should operate in order to improve performance. For example, the controller may send instructions to one or more optical amplifiers in the link to increase or decrease their respective gains, based on the enhanced information about the fiber types in their respective spans.

In a meshed optical network, a given span may be shared by more than one link. Accordingly, the methods 300 and 400 may be applied in different links to obtain multiple parameter estimates for a shared span. These estimates may be combined with each other and, optionally, with estimates obtain from other estimation methods to improve the overall estimate for the span. For example, in a network where a first link and a second link share a common span, a controller device of the network may be configured to combine a first link parameter estimate identified by a first electronic device and associated with the common span, with a second link parameter estimate identified by the second electronic device and associated with the common span, thereby generating an improved estimate of that link parameter for the common span. Alternatively, or additionally, a link parameter estimate may be improved by configuring the controller device to combine one or more link parameters estimates identified by one or more electronic devices in the network, according to the methods described herein, with link parameter measurements or estimates obtained by other means. For example, span net dispersion may be estimated by measuring propagation delay of optical pulse sources at two wavelengths. The sources may be opportunistically borrowed from their original optical time-domain reflectometer (OTDR) purpose. Alternatively, or additionally, the other measurements used to improve link parameter estimates may comprise archived estimates from earlier measurement campaigns. In another example, independent per-span estimates of fiber type, dispersion or other link parameters may be obtained using electrostriction, as described by Shiner et al. in U.S. Ser. No. 15/828,497 filed on Dec. 1, 2017, incorporated herein by reference.

One or more of the transmitter and the receiver referred to in the above examples may comprise a coherent transceiver or modem. The ability to calculate a C-matrix from a received signal may be a built-in function of a coherent modem. Accordingly, in some examples, no additional hardware or costly equipment may be needed to provide a coherent modem with the functionality to sweep through a series of CD pre-compensation/post-compensation pairs in order to extract link information.

Figure 5A:
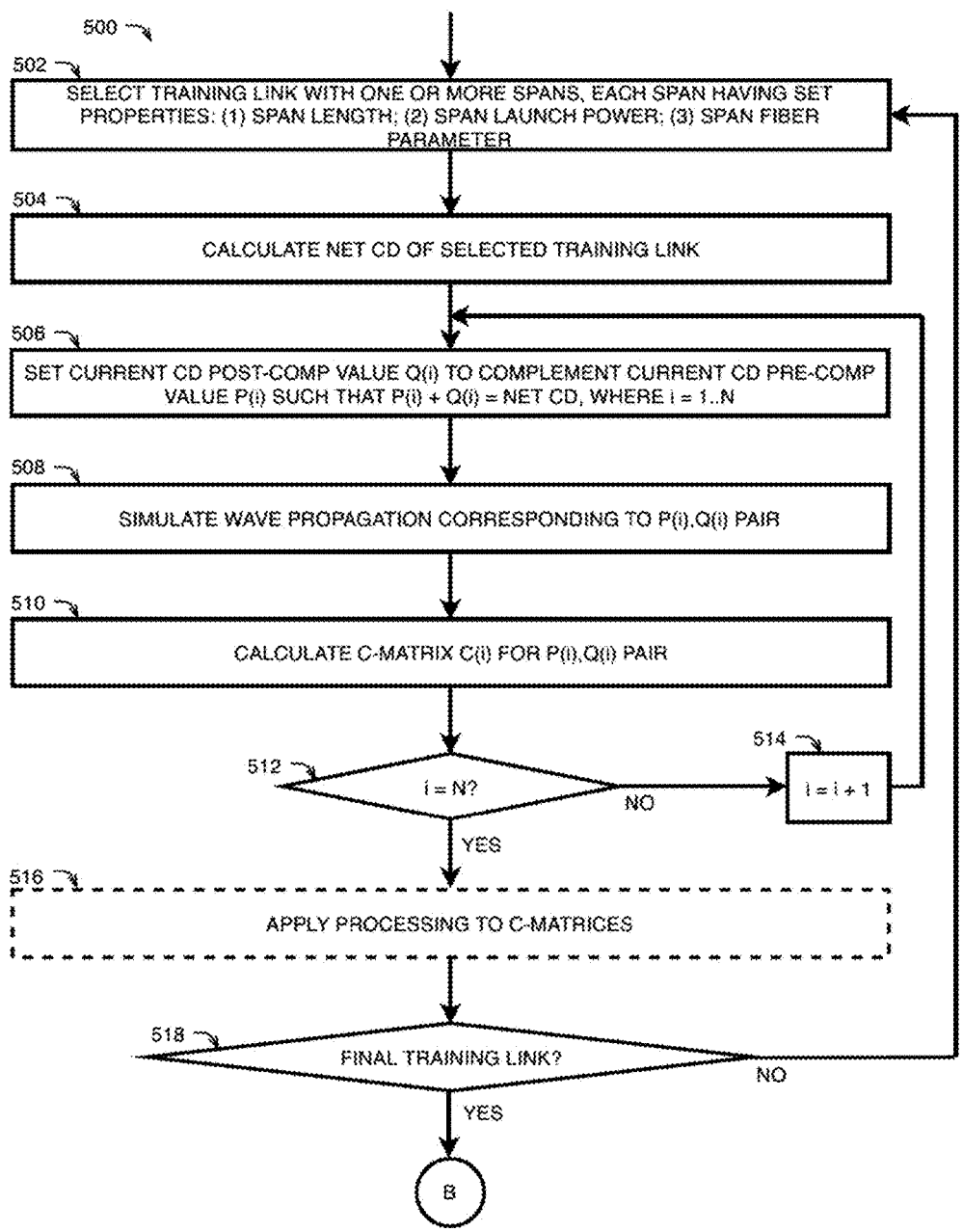
FIGS. 5A-5B illustrate a method for artificial neural network (ANN) training in accordance with some examples of the technology disclosed herein.
Figure 5B:
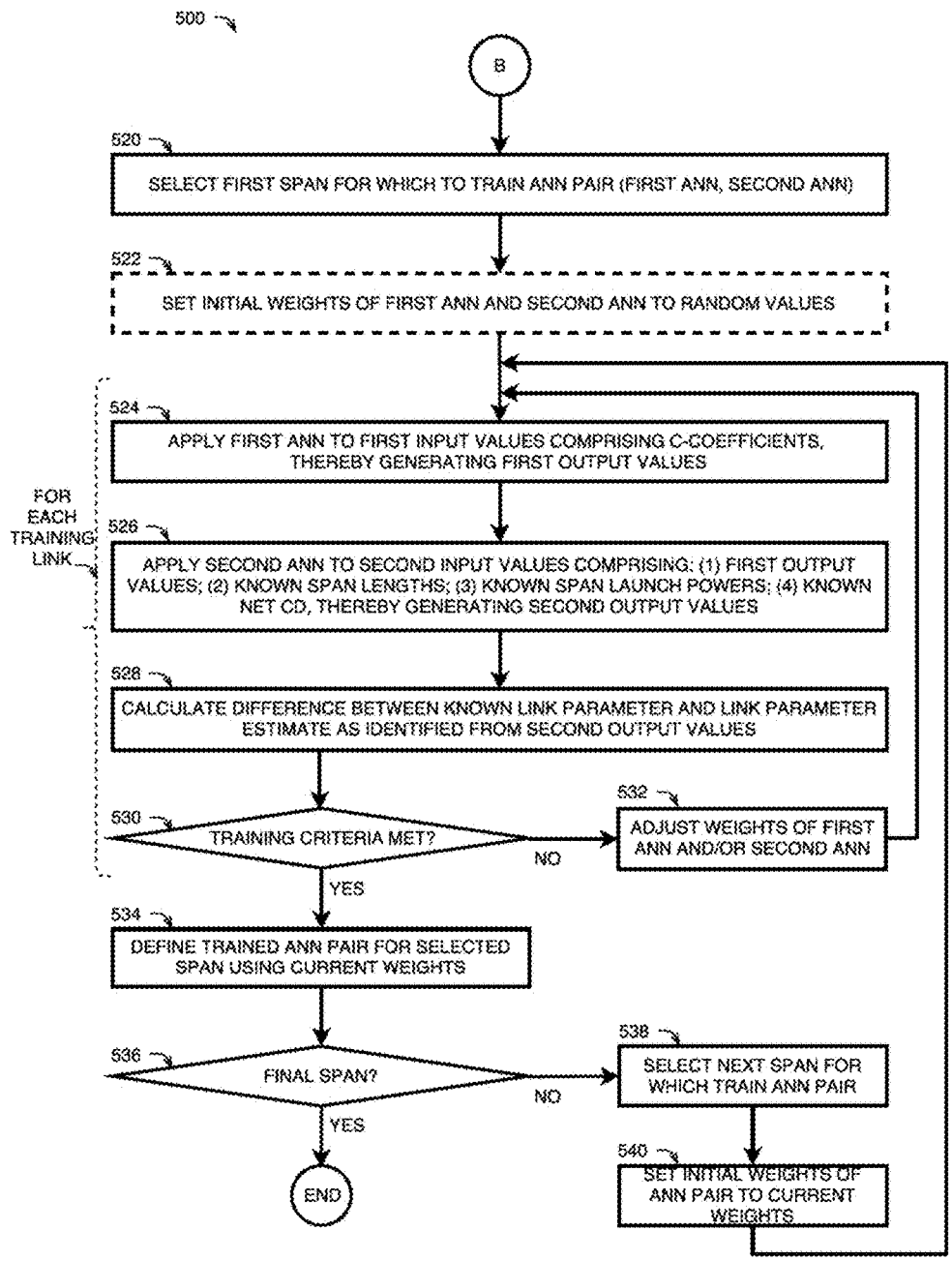

FIGS. 5A-5B illustrate a method for ANN training 500 in accordance with some examples of the technology disclosed herein.

The ANN training method 500 comprises a series of computer-executable instructions, stored on a computer-readable medium, which may be executed by one or more processors of one or more electronic devices, such as one or more CPUs, one or more GPUs, or some combination thereof. The ANN training method 500 may be more computationally expensive than the fiber identification methods 300 and 400. For example, the ANN training method 500 may require multiple days to complete, whereas the fiber identification method 400 may be completed in a matter of milliseconds. Accordingly, training of the ANNs for fiber identification, using the method 500, for example, may be decoupled from the actual identification of parameters in a given link, using the method 300 or 400 for example. In one example, the ANN training method 500 may be performed offline using either simulation data or real data collected from known links.

The ANN training method 500 begins at 502 with the selection of a training link comprising one or more spans. The selected training link may be a simulated link or real link. In either case, a set of properties may be defined for each span, including span length, span launch power, and at least one span fiber parameter. Examples of span fiber parameters include fiber type(s), effective fiber core area, attenuation, ONLC, and the like. In general, training links may be selected to have properties that are realistic for the types of links to which the ANNs are to be applied. There may be significant differences in link properties according to location (i.e., region, country, continent, etc.) and also according to application (i.e., metro networks, regional networks, long-haul networks, submarine networks, etc.). Accordingly, it may be of interest to have a variety of ANN models that have been trained for different circumstances. The training link selected at 502 may be used to train the ANNs to be used in the fiber identification methods 300 and 400.

At 504, the net CD may be calculated for the training link selected at 502.

At 506, a current pair of CD pre-compensation and CD post-compensation values, denoted P(i) and Q(i) respectively, may be set for the training link, where i=1 . . . N, where N is a positive integer. As described with respect to FIG. 4, the CD pre-compensation values P(i) and the CD post-compensation values Q(i) may be referred to in units of percentage of the net CD of the link, such that P(i)+Q(i)=100%.

At 508, propagation of a waveform may be simulated over the training link selected at 502 for (P(i),Q(i)) pair defined at 406.

At 510, a C-matrix C(i) may be calculated based on the waveform propagation simulated at 508, which corresponds to the current (P(i),Q(i)) pair.

At 512, a determination may be made whether one or more additional C-matrices are to be calculated for one or more additional (P(i),Q(i)) pairs. Where it is determined that the index i is not yet equal to the number N of C-matrices that are to be calculated, the index i may be incremented by 1, as denoted at 514. At this point, the method may set a new (P(i),Q(i)) pair at 506, simulate a new waveform propagation at 508, and calculate a new C-matrix at 510. In this manner, a plurality of C-matrices may be calculated, where each C-matrix corresponds to a different (P(i),Q(i)) pair. In a variation of the method 500 (not shown), the series of waveform propagation results may be stored in memory, and the plurality of C-matrices may only be calculated after all waveform propagations in the series have been simulated. In one example, the saved propagation results might be used for some other application or to re-train the machine learning algorithm. As an alternative to waveform propagation simulations, C-matrices may be calculated based on a first order perturbation model.

Once it is determined at 512 that no additional C-matrices are to be calculated (i.e., that index i=N), the method may optionally proceed to 516, at which point processing may be applied to the N C-matrices that have been calculated for the selected training link. The processing may comprise data reshaping, zero padding, or both.

In order to improve the accuracy of the trained ANNs, many different training links may be used. For example, if it is determined at 518 that the current training link is not the final link to be used for training, the method may proceed back to step 502, and a new training link may be selected which has at least some properties that differ from the previous training link. The net CD of the new training link may be calculated at 504, a plurality of C-matrices may be calculated for the new training link corresponding to a plurality of (P(i),Q(i)) pairs, according to steps 506 through 514, optionally followed by the processing at 516.

Once it is determined at 518 that the current training link is the final training link, the properties of all of the training links and the corresponding C-matrices calculated at 510 may be used to train the first and second ANNs to perform link parameter identification in accordance with the methods 300 and 400, for example.

At Link B, the method 500 continues to the steps illustrated in FIG. 5B.

In the example method 500, ANN training is performed on a per-span basis. That is, for a given span of a link for which unknown link parameters are to be estimated, there is a corresponding ANN pair (comprising a first ANN and a second ANN) that has been trained for that span. Since each ANN pair may be trained for a different span, the properties of each ANN pair may differ as a function of span index. For example, the optimal weights determined during training of the first and second ANNs for one span may differ from the optimal weights determined during training of the first and second ANNs for another span. In the example method 500, the first ANN is assumed to have the same architecture across all spans, differing only by its weights as determined during training for each span. Similarly, the second ANN is assumed to have the same architecture across all spans, differing only by its weights as determined during training for each span. In other examples (not shown), the architecture of the ANN pair that is trained for one span may differ from the architecture of the ANN pair that is trained for another span. For example, the first ANN that is trained for a span index j could have a different number of layers than the first ANN that is trained for a span index k. Where the architectures of the ANNs differ as a function of span index, training steps 520-540 may be modified.

At 520, a first span may be selected for training the first ANN and the second ANN of the ANN pair. In one example, the first span may have a span index that is located at or proximal to the middle of the link. At 522, initial weights of the first ANN and the second ANN may optionally be set to random values. Each random value may be within an expected range.

At 524, for each training link, the corresponding C-coefficients calculated for that link may be inputted into the first ANN, thereby generating first output values for each training link.

At 526, the first output values generated at 524 for each respective training link may be inputted into the second ANN, together with the corresponding known parameters for each respective training link, such as the span lengths, span launch powers, and the net CD of the training link. The second ANN may generate second output values, from which an estimate of a link parameter may be identified. For example, the second ANN may be designed to output a value that is correlated with a particular fiber type (e.g., 1=NDSF; 2=LEAF; 3=TERA, etc.), or an ONLC corresponding to a particular fiber type (e.g., 34.51 dB=NDSF; 28.01 dB=LEAF; 29.76 dB=TERA, etc.).

At 528, for each training link, the difference between the known link parameter and the link parameter estimate as determined from the second output values may be calculated. At 530, it may be determined whether certain training criteria have been met for the ANN pair. In one example, the training criteria may be met when the average or sum of the differences calculated for each training link at 528 is less than some threshold value. That is, the average of the differences (or the sum of the differences) may be compared to a threshold value. If the average (or sum) is determined to exceed the threshold value, it may be determined that the training criteria have not yet been met, and the method may proceed to 532. Here, the weights used in one or both of the first ANN and the second ANN may be adjusted in a manner that is expected to reduce the average (or sum) of the differences calculated at 528. In one example, the ANN weight adjustment may be performed using scaled conjugate gradient backpropagation. Following adjustment of the first and/or second ANN weights, properties associated with the training links may again be inputted to the first ANN at 524 and the second ANN at 526, and the difference between the known link parameter and the link parameter estimate as determined from the second output values may again be calculated for each training link at 528. In this manner, the ANN pair (including the first ANN and the second ANN) is trained in a series of iterations, in which the ANN weights are incrementally adjusted until training criteria are met at 530. The determination of whether or not the training criteria have been met at 530 may alternatively or additionally depend the number of ANN weight adjustments that have already been performed at 532 (i.e., the number of iterations).

Once it is determined at 530 that the training criteria have been met, the current weights may be used to define the first trained ANN and second trained ANN for the currently selected span, which in this case is the first span as selected at 520.

Where it is determined at 536 that the currently selected span is not the final span for which the ANN pair is to be trained, the method may proceed to 538, at which point a next span may be selected for which to train the ANN pair. The next span may be adjacent to the preceding span. In one example, where the first span selected at 520 is located substantially at the middle of the link, the selection of subsequent spans at 538 may alternate about either side of the first span, moving successively towards the ends of the link with each selection.

As shown at 540, when initializing the parameters of the ANN pair that is to be trained for the span selected at 538, the initial weights for the first and second ANNs may be set to the current weights that have been used to define the first and second trained ANNs for the preceding span, as shown at 534. That is, instead of initializing the ANN parameters to substantially random values, as was done for the first span at 522, the ANN parameters may be initialized to the optimal values that were determined for the previous span. The optimal values determined for the previous span may be closer to the convergence point of the next span (selected at 538), which may lead to a significantly faster training time. This technique of transfer learning may be used to achieve successively shorter training times for each subsequent span in the link. For example, training an ANN pair for a first span of a twenty-span link, using random initial weights, could take seven days using a single GPU. However, training the ANN pair for subsequent spans while making use of the information learned from the earlier training, could reduce the training time down to only one day. It is estimated that the implementation of transfer learning from one span to the next may reduce overall training time by approximately 80% for a twenty-span link.

Using the ANN weights set at 540, steps 524 through 534 may be repeated for each subsequent span index selected at 538. In this manner, a plurality of ANN pairs may be trained to output per-span link parameters based on inputs associated with the training links. Once it is determined at 536 that there are no further spans for which the ANN pairs are to be trained, the trained ANN pairs defined at 534 may be used to estimate unknown link parameters, for example, according to the methods 300 and 400.

Figure 6:
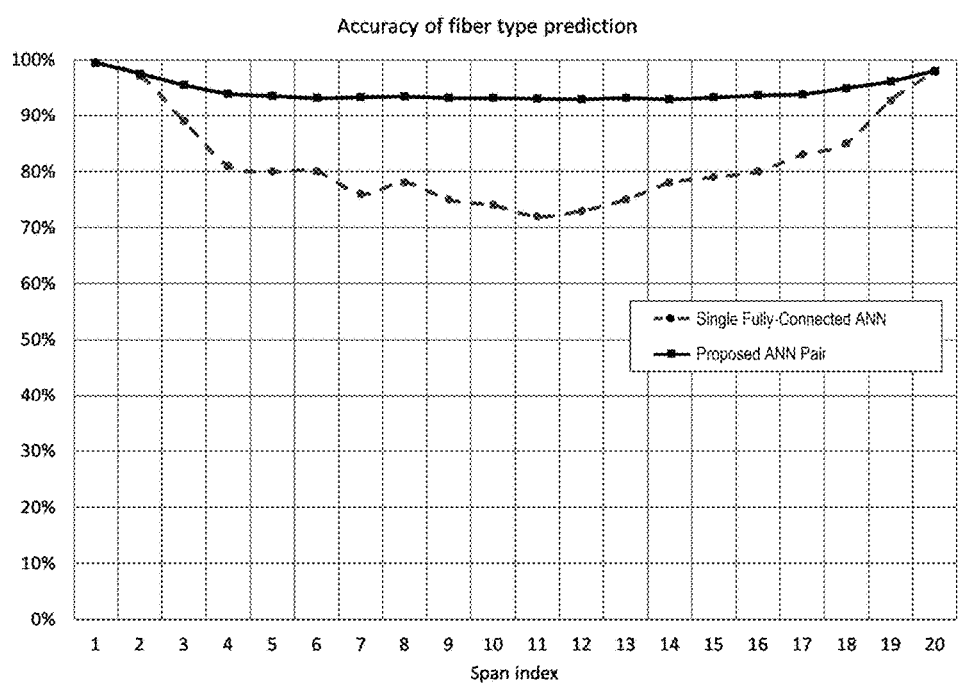
FIG. 6 illustrates example simulation results showing the probability of accurately identifying fiber type in each span of a twenty-span link using an ANN pair in accordance with some examples of the technology disclosed herein, relative to performing link parameter identification using a single, shallow fully-connected ANN.

FIG. 6 illustrates example simulation results showing the probability of accurately identifying fiber type in each span of a twenty-span link using an ANN pair in accordance with some examples of the technology disclosed herein, relative to performing link parameter identification using a single, shallow fully-connected ANN.

800,000 different training links were used to train twenty ANN pairs, each ANN pair being trained for a different span of the twenty-span link. The trained ANN pairs were then validated on 100,000 different validation links, and tested on 100,000 different testing links. Spans were chosen from six possible fiber types: NDSF, TWC, LS, TWRS, LEAF, and TERA, where the distribution of fiber types across all 1,000,000 links was 35%, 15%, 15%, 15%, 10%, and 10%, respectively. The average span length across all 1,000,000 links was 80 km, with a variance of 20 km. The launch power of each span was provisioned at the optimal optical launch power, which minimizes the sum of linear and nonlinear noise, assuming the fiber type was NDSF plus a Gaussian variable with a standard deviation of 0.5 dB. In each simulation, a 56 Gbaud signal was used.

The C-matrices were calculated using a first order perturbation model, with each C-matrix consisting of 300 C-coefficients (300 real values and 300 imaginary values). Forty different CD pre-compensation/post-compensation pairs were used, thereby resulting in a total 24,000 nonlinearity values, including 12,000 real values and 12,000 imaginary values.

For the simulations performed using the ANN pair, the first ANN had a ResNet architecture comprising 25 layers. For each of the links, the 12,000 real C-coefficients and the 12,000 imaginary C-coefficients were reshaped, respectively, into two matrices having dimensions 300×40, which were then combined into a single three-dimensional matrix having dimensions 300×40×2. Zero padding was then applied to this matrix to generate a nonlinearity input data set having dimensions 304×48×2. The first ANN was applied to the nonlinearity data set to generate 152 first output values.

The second ANN had a fully-connected architecture comprising 5 layers. For each link, the second ANN was applied to the 152 first output values generated by the first ANN, and also to second input values comprising: (i) twenty launch power values (one for each span of the link); (ii) twenty length values (one for each span of the link); and (iii) one net CD value for the link. The output layer of the second ANN used a softmax function to provide probabilities for each of the six possible fiber types for the given span. For each of the testing links, the ONLC of the fiber type having the highest probability for the given span was compared to the actual ONLC of the span, thereby providing an indication of the accuracy of the link parameter identification method 400.

For comparison, simulations were also performed using a single fully-connected ANN having 5 layers. In these simulations, the 24,000 nonlinearity values were processed using PCA so as to generate a reduced set of 100 C-coefficients (100 real values and 100 imaginary values). For each link, the single, fully-connected ANN was applied to input values comprising: (i) the 200 nonlinearity input values; (ii) twenty launch power values (one for each span of the link); (iii) twenty length values (one for each span of the link); and (iv) one net CD value for the link.

As is apparent in FIG. 6, using the trained ANN pair as described with respect to the methods 400 and 500 may provide a higher level of accuracy than using the single fully-connected ANN. For example, the identification error rate for mid-link spans is reduced by a factor of 5 to 7, as compared to the single fully-connected ANN. The accuracy of the ANN pair could be further improved by training the second ANN for a longer period of time.

Figure 7:
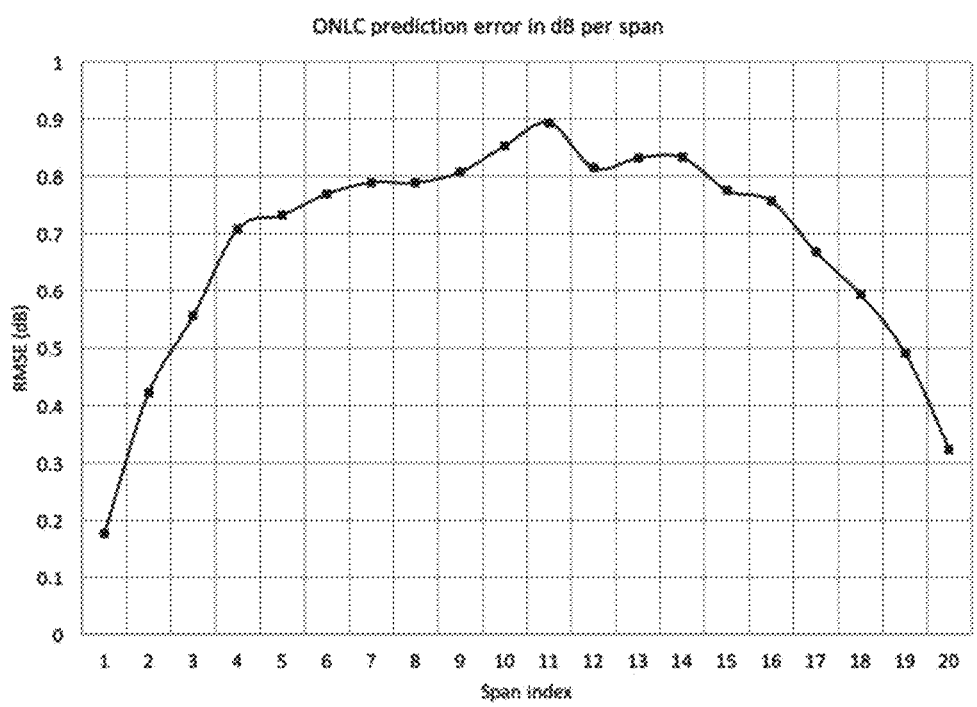
FIG. 7 illustrates example simulation results showing the error in the optical nonlinear coefficient (ONLC) estimate for each span of a twenty-span link, each estimate having been identified using an ANN pair in accordance with some examples of the technology disclosed herein.

FIG. 7 illustrates example simulation results showing the error in the ONLC estimate for each span of a twenty-span link, each estimate having been identified using an ANN pair in accordance with some examples of the technology disclosed herein.

The parameters used for the simulations in FIG. 7 were identical to those used for the simulations in FIG. 6. For each span of each testing link, the ONLC estimate was determined by performing a summation across all six fiber types (NDSF, TWC, LS, TWRS, LEAF, and TERA) of the true ONLC of each fiber type (34.51 dB, 23.92 dB, 21.60 dB, 25.83 dB, 28.01 dB, and 29.76 dB, respectively), weighted by the respective probability of that fiber type, as outputted by the softmax layer of the second ANN. For each span of each testing link, the difference between the ONLC estimate and the true ONLC was calculated in dB. FIG. 7 illustrates the route-mean-square error (RMSE) in dB for each span across all 100,000 testing links. As is apparent, the error in the ONLC estimates is the lowest for spans that are close to the transmitter and to the receiver, and increases for mid-link spans.

The scope of the claims should not be limited by the details set forth in the examples, but should be given the broadest interpretation consistent with the description as a whole.

What is claimed is:

1. A method for link parameter identification in an optical communications system, the method comprising:
   applying a first trained artificial neural network (ANN) to first input values representative of nonlinear noise in a signal received at a receiver from a transmitter over a link in the optical communications system, thereby generating first output values;
   applying a second trained ANN to second input values comprising the first output values and one or more known parameters of the link, thereby generating second output values; and
   identifying one or more link parameter estimates of the link based on the second output values.

2. The method as claimed in claim 1, wherein the first trained ANN has an architecture specialized for two-dimensional image recognition.

3. The method as claimed in claim 2, wherein the first trained ANN comprises a deep residual learning network (ResNet) or a Convolution Neural Network (CNN).

4. The method as claimed in claim 1, wherein the second trained ANN is fully connected.

5. The method as claimed in claim 1, wherein the one or more link parameter estimates comprise one or more of: a fiber type estimate for each span in the link, an optical nonlinear coefficient (ONLC) estimate for each span in the link, a CD coefficient estimate for each span in the link, an effective fiber core area estimate for each span in the link, an attenuation coefficient for each span in the link, and a length of each span in the link.

6. The method as claimed in claim 1, wherein the one or more known parameters of the link comprise one or more of: a net chromatic dispersion (CD) of the link, a length of each span in the link, and a launch power of each span in the link.

7. The method as claimed in claim 1, wherein the second output values comprise a set of fiber type probability values for each span of the link, and wherein, for a particular span, each fiber type probability value represents a probability that the particular span comprises a respective fiber type from a set of possible fiber types.

8. The method as claimed in claim 7, wherein the fiber type probability values are generated by a softmax output layer.

9. The method as claimed in claim 7, further comprising:
   for the particular span, identifying an estimate of a particular parameter by performing a summation, across the set of possible fiber types, of a known value of the particular parameter associated with each respective fiber type, weighted by the respective fiber type probability value.

10. A method for training one or more artificial neural networks (ANNs) used for link parameter identification in a multi-span link between a transmitter and a receiver in a communications system, the method comprising:
    for a particular span of the link, implementing transfer learning by initializing weights of the one or more ANNs to optimum values determined during training of the one or more ANNs for a previous span of the link; and
    training the one or more ANNs for the particular span of the link by iteratively adjusting the weights of the one or more ANNs, beginning from the initialized weights, to determine optimum weights for the particular span.

11. The method as claimed in claim 10, wherein the one or more ANNs comprise a first ANN and a second ANN, and wherein the training comprises:
    applying the first ANN to first input values representative of nonlinear noise in a signal over the link to generate first output values;
    applying the second ANN to the first output values and to one or more known parameters of the link to generate second output values;
    calculating a difference between a known link parameter and a link parameter estimate identified from the second output values; and
    adjusting the weights of the first ANN or the second ANN or both based on the difference.

12. A non-transitory computer-readable medium storing computer-executable instructions which, when executed by a processor of an electronic device configured for link parameter identification in an optical communications system, cause the device:
    to apply a first trained artificial neural network (ANN) to first input values representative of nonlinear noise in a signal received at a receiver from a transmitter over a link in the optical communications system, to thereby generate first output values;

to apply a second trained ANN to second input values comprising the first output values and one or more known parameters of the link, to thereby generate second output values; and to identify one or more link parameter estimates of the link based on the second output values.

13. The non-transitory computer-readable medium as claimed in claim 12, wherein the first trained ANN has an architecture specialized for two-dimensional image recognition.

14. The non-transitory computer-readable medium as claimed in claim 13, wherein the first trained ANN comprises a deep residual learning network (ResNet) or a Convolution Neural Network (CNN).

15. The non-transitory computer-readable medium as claimed in claim 12, wherein the second trained ANN is fully connected.

16. The non-transitory computer-readable medium as claimed in claim 12, wherein the one or more link parameter estimates comprise one or more of: a fiber type estimate for each span in the link, an optical nonlinear coefficient (ONLC) estimate for each span in the link, a CD coefficient estimate for each span in the link, an effective fiber core area estimate for each span in the link, an attenuation coefficient for each span in the link, and a length of each span in the link.

17. The non-transitory computer-readable medium as claimed in claim 12, wherein the one or more known parameters of the link comprise one or more of: a net chromatic dispersion (CD) of the link, a length of each span in the link, and a launch power of each span in the link.

18. The non-transitory computer-readable medium as claimed in claim 12, wherein the second output values comprise a set of fiber type probability values for each span of the link, and wherein, for a particular span, each fiber type probability value represents a probability that the particular span comprises a respective fiber type from a set of possible fiber types.

19. The non-transitory computer-readable medium as claimed in claim 18, wherein the fiber type probability values are generated by a softmax output layer.

20. The non-transitory computer-readable medium as claimed in claim 18, wherein the computer-executable instructions, when executed by the processor, further cause the device:

for the particular span, to identify an estimate of a particular parameter by performing a summation, across the set of possible fiber types, of a known value of the particular parameter associated with each respective fiber type, weighted by the respective fiber type probability value.

* * * * *